United States Patent
Lardellier

(10) Patent No.: US 7,656,054 B2
(45) Date of Patent: Feb. 2, 2010

(54) TURBINE ENGINE WITH AN ALTERNATOR AND METHOD FOR TRANSMITTING MOVEMENT TO AN ALTERNATOR

(75) Inventor: Alain Marie Joseph Lardellier, Melun (FR)

(73) Assignee: SNECMA, Paris (FR)

( * ) Notice: Subject to any disclaimer, the term of this patent is extended or adjusted under 35 U.S.C. 154(b) by 283 days.

(21) Appl. No.: 11/774,321

(22) Filed: Jul. 6, 2007

(65) Prior Publication Data

US 2008/0006023 A1 Jan. 10, 2008

(30) Foreign Application Priority Data

Jul. 7, 2006 (FR) .................................. 06 52866

(51) Int. Cl.
*H02P 9/04* (2006.01)
*F02C 7/262* (2006.01)

(52) U.S. Cl. .................. 290/52; 290/40 C; 60/226.1

(58) Field of Classification Search .................. 290/52, 290/45, 47, 40 C; 60/226.1, 668
See application file for complete search history.

(56) References Cited

U.S. PATENT DOCUMENTS

| | | | |
|---|---|---|---|
| 3,964,506 A | | 6/1976 | Grundman |
| 4,776,163 A | * | 10/1988 | Brockmann .................. 60/792 |
| 5,793,136 A | * | 8/1998 | Redzic ......................... 310/114 |
| 6,279,852 B1 | * | 8/2001 | Dusserre-Telmon et al. ... 244/60 |
| 6,340,847 B1 | * | 1/2002 | Kawabata et al. ......... 290/40 C |
| 6,467,725 B1 | * | 10/2002 | Coles et al. .................... 244/58 |
| 6,672,049 B2 | * | 1/2004 | Franchet et al. ............. 60/226.1 |
| 6,732,529 B2 | * | 5/2004 | Anderson ..................... 60/772 |
| 6,914,344 B2 | * | 7/2005 | Franchet et al. ............... 290/52 |
| 7,168,913 B2 | * | 1/2007 | Lardellier ..................... 415/70 |
| 7,285,871 B2 | * | 10/2007 | Derouineau ................... 290/52 |
| 7,514,810 B2 | * | 4/2009 | Kern et al. ..................... 290/52 |
| 2008/0136189 A1 | * | 6/2008 | Qu et al. ....................... 290/52 |
| 2008/0174194 A1 | * | 7/2008 | Qu et al. ...................... 310/114 |
| 2009/0015011 A1 | * | 1/2009 | Colin et al. ................... 290/52 |

FOREIGN PATENT DOCUMENTS

| | | |
|---|---|---|
| EP | 1 270 903 A1 | 1/2003 |
| GB | 2 411 437 A | 8/2005 |
| WO | WO 95/02120 | 1/1995 |

* cited by examiner

*Primary Examiner*—Nicholas Ponomarenko
(74) *Attorney, Agent, or Firm*—Oblon, Spivak, McClelland, Maier & Neustadt, L.L.P.

(57) ABSTRACT

A twin-spool turbine engine includes a low-pressure rotor and a high-pressure rotor, an alternator, including an inductor winding and an armature, the high-pressure rotor rotating the inductor winding of the alternator. The armature is mounted so as to rotate and the low-pressure rotor is connected to a clutch arranged so that the low-pressure rotor drives the armature in a manner that is contrarotational to the inductor winding when the clutch are engaged.

7 Claims, 2 Drawing Sheets

TURBINE ENGINE WITH AN ALTERNATOR AND METHOD FOR TRANSMITTING MOVEMENT TO AN ALTERNATOR

The invention relates to the field of twin-spool turbine engines mechanically driving an alternator.

BACKGROUND OF THE INVENTION

A portion of the power generated by an aviation turbine engine is used for supplying various members of the turbine engine but also of the aircraft whose turbine engine participates in the propulsion.

A portion of this power is currently taken off at the high-pressure compressor, whose compressed air is used particularly for pressurizing and air conditioning the aircraft cabin, or else deicing. Another portion of this power is taken off mechanically from the shaft of the high-pressure (HP) body of the turbine engine, in order to drive the input shaft of an accessory gearbox. This input shaft is rotated by a transmission shaft extending in a structural arm of the casing and itself driven by a gear fixedly attached to the HP shaft.

The accessory gearbox (AGB), well known to those skilled in the art, comprises various machines, or accessories, for example an electric generator, a starter, an alternator, hydraulic, fuel or oil pumps, etc. These various accessories are mechanically driven by the power taken off from the HP shaft as has just been seen.

The current trend aims to increase the portion of the mechanical power offtake that is converted into electric power because of the increasing role of electric means that are considered to be more flexible to use on the aircraft.

However, too high a mechanical power offtake has a negative effect on the operation of the HP body, because it is capable of causing pumping of the HP compressor, in particular when the engine operates at low speed. This effect is all the more problematic when the demand for power is just as great, if not greater, at idle speeds as at cruising or "full throttle" speeds: the offtake from the HP body, as a proportion of the total power, is then very great and the risk of pumping very high.

DESCRIPTION OF THE PRIOR ART

The prior art teaches that a portion of the mechanical power should be taken from the low-pressure (LP) body. A movement transmission shaft is, in this case, driven by each of the HP and LP shafts. Usually, a differential allows the coupling of the movement transmission shafts, the output shaft of the differential being inserted as an input of an alternator. However, even with a differential, the proportion of power taken from the HP shaft is, at idle speed, far greater than that taken off from the LP shaft.

Specifically, the differential is arranged so that the offtake is distributed between the HP shaft and the LP shaft at cruising speed. At idle speed, the speed reduction of the LP shaft is proportionally greater than the speed reduction of the HP shaft, which means that, at idle speed, the offtake from the HP shaft increases even more. As an example that reflects conventional values for a twin-spool turbine engine, suppose that, at full throttle, the speed of the HP body is 16 000 revolutions per minute, while the speed of the LP body is 4500 revolutions per minute; at idle speed, the speed of the HP body will be 8000 revolutions per minute (namely a speed ratio of the order of 2) while the speed of the LP body will be 1000 revolutions per minute (or a speed ratio of the order of 4.5).

The result of this is that, at idle speed, the required power, that is the same as at full throttle, is mainly taken from the HP shaft, while the latter rotates half as fast as at full throttle speed. The risks of pumping of the HP compressor are therefore great.

One solution to this problem would be to provide an automatic gearbox between the two shafts. However, such a gearbox is extremely heavy and costly to install and requires a particular electro-hydraulic controller.

SUMMARY OF THE INVENTION

The object of the invention is to propose a turbine engine with a device for driving the alternator that is simpler to install and lighter than a gearbox, while allowing a drive of the alternator in which the proportion of power taken from the HP body at low speed is not too great in comparison with the power taken from the LP body.

Accordingly, the invention relates to a twin-spool turbine engine, comprising a low-pressure rotor and a high-pressure rotor, an alternator, comprising an inductor winding and an armature, the high-pressure rotor rotating the inductor winding of the alternator, wherein the armature is mounted so as to rotate and the low-pressure rotor is connected to clutch means arranged so that the low-pressure rotor drives the armature in a manner that is contrarotational to the inductor winding when the clutch means are engaged.

Thanks to the invention, the clutch means may or may not be engaged depending on the engine speed and the demand for electric power. In particular, the clutch means are engaged at idle speed. In this case, the LP rotor drives the armature in a manner that is contrarotational to the inductor winding. In this way, the tangential speed of the inductor winding relative to the armature is equal to the sum of the absolute values of the speeds of the armature and the inductor winding. The power is therefore taken in a manner distributed between the LP rotor and the HP rotor, without it being necessary for these powers to be too great since they are added together.

Preferably, the turbojet comprising a fixed structure, the clutch means are arranged so that, when they are disengaged, they render the armature fixedly attached in rotation to the fixed structure and thereby stop it rotating, and, when they are engaged, they connect the armature with the low-pressure rotor of the turbine engine.

Again preferably, the clutch means comprise a clutch-brake.

Still preferably, the clutch means are controlled by hydraulic means.

According to a preferred embodiment, the alternator being placed in a radially eccentric position on the turbojet, the movement is transmitted from the low-pressure rotor and high-pressure rotor to the armature and the inductor winding by transmission shafts that are radial relative to the axis of the turbine engine.

The invention also relates to a method of transmitting movement to an alternator, in a twin-spool turbine engine, comprising a low-pressure rotor and a high-pressure rotor, an alternator, comprising an inductor winding and an armature, wherein:

at a first engine speed, the high-pressure rotor rotates the inductor winding of the alternator, the armature remaining fixed, and at a second engine speed, the high-pressure rotor rotates the inductor winding of the alternator and the low-pressure rotor drives the armature in a manner that is contrarotational to the inductor winding.

Preferably, the turbojet comprises clutch means, arranged so that the low-pressure rotor drives the armature in a manner that is contrarotational to the inductor winding when the clutch means are engaged and the armature remains fixed when the clutch means are disengaged.

BRIEF DESCRIPTION OF THE DRAWINGS

The invention will be better understood with the aid of the following description of the preferred embodiment of the turbojet of the invention, with reference to the appended drawings, in which:

FIGS. 1 and 2 represent the totality—for FIG. 1—or the virtual totality—for FIG. 2—of the mechanical power transmission device, from the high-pressure (HP) rotor and low-pressure (LP) rotor to the alternator, the other elements of the turbojet not having been represented because they are well known to those skilled in the art.

DESCRIPTION OF THE PREFERRED EMBODIMENTS

Figure 1:
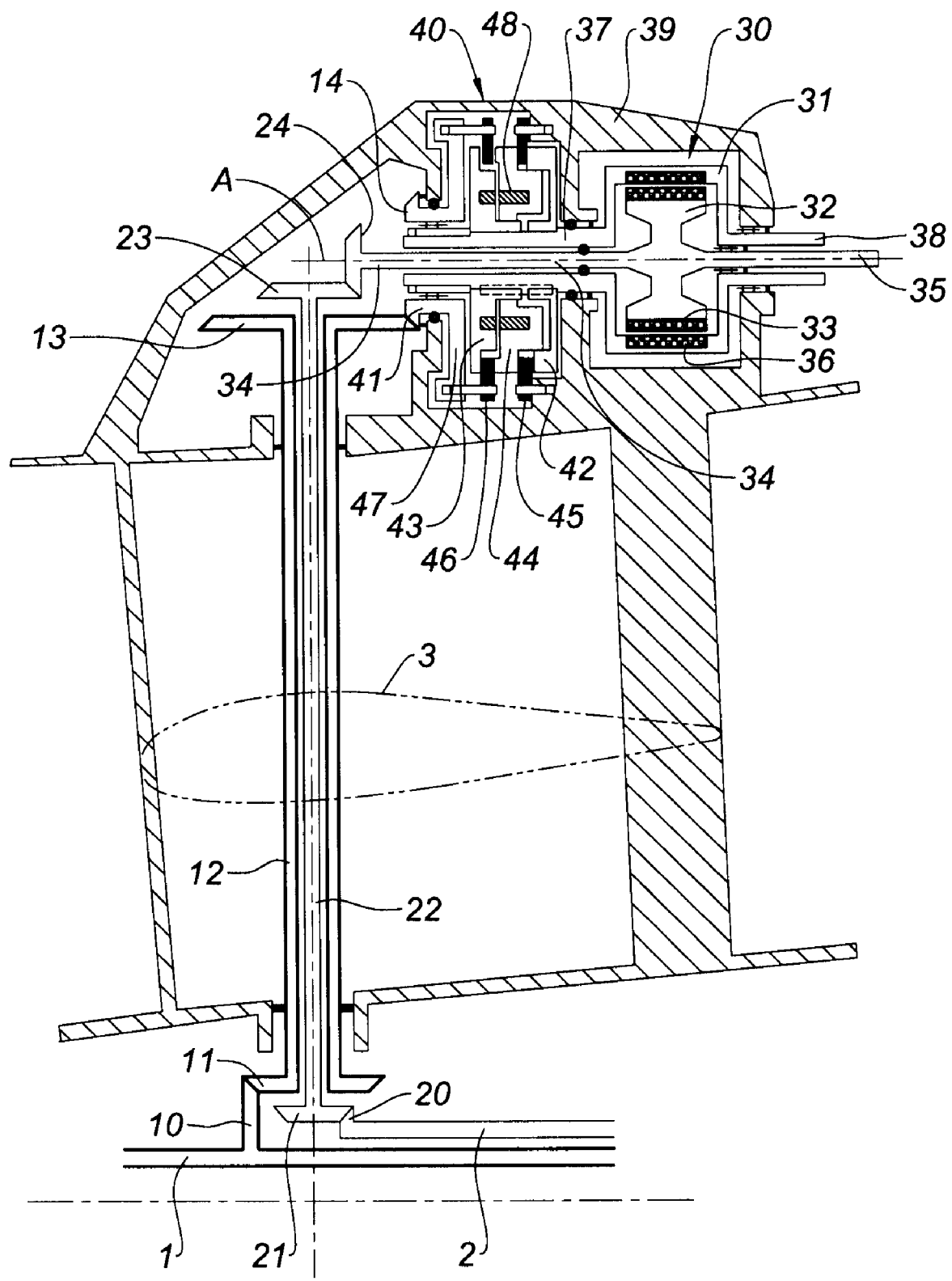
FIG. 1 is a schematic representation, in axial section and in profile, of the mechanical power transmission system of the turbojet of the invention, from the LP and HP rotors to the alternator
Figure 2:
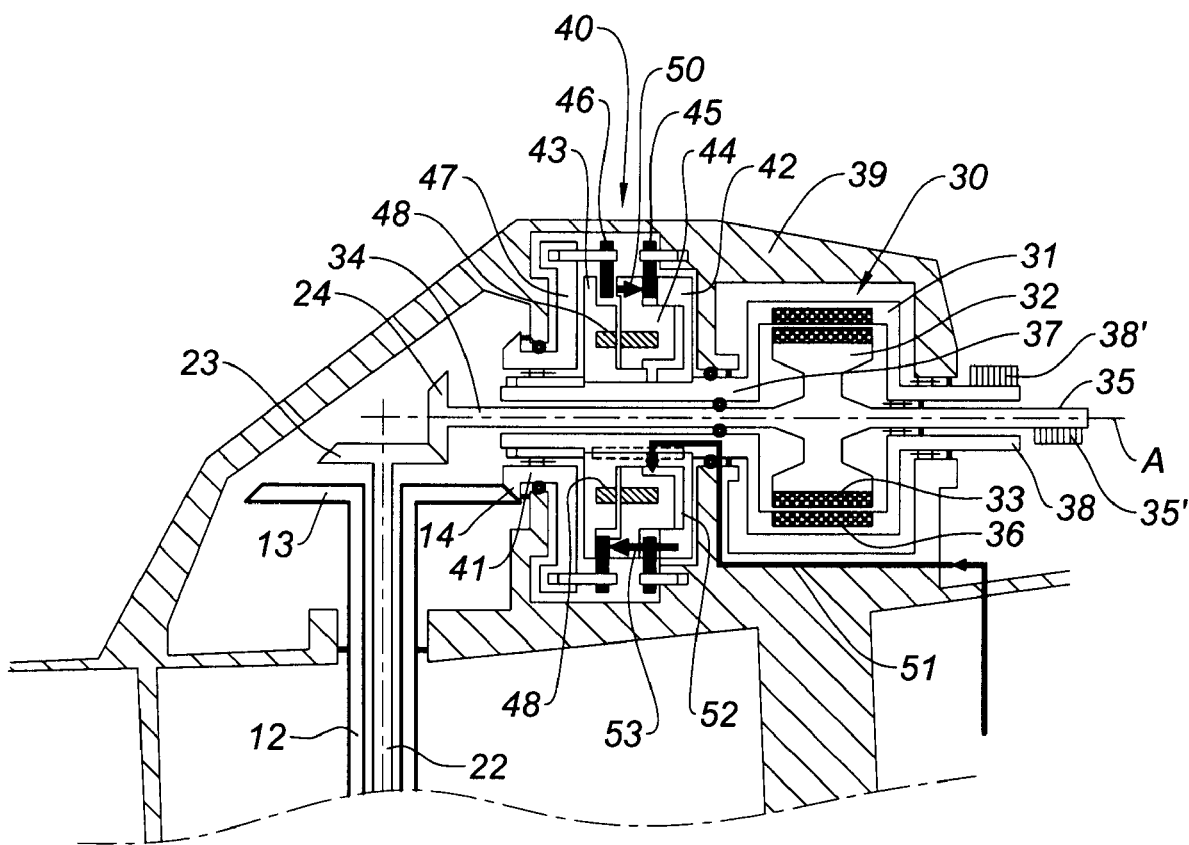
FIG. 2 is an enlarged schematic representation of the system of FIG. 1, with, in the portion of the figure situated above the axis A of the alternator, the clutch-brake in the disengaged position and, in the portion of the figure situated below the axis A of the alternator, the clutch-brake in the engaged position.

With reference to these FIGS. 1 and 2, the turbine engine of the invention is a twin-spool turbine engine comprising a low-pressure (LP) rotor 1 and a high-pressure (HP) rotor 2. This type of turbine engine is well known to those skilled in the art. In this instance it is a turbojet. In fact it is any turbine engine comprising a compressor and a turbine, twin-spool, with a low-pressure body and a high-pressure body. Each of the rotors 1, 2 comprises, at its periphery, longitudinally approximately at the structural arms of the intermediate casing of the turbojet, a bevel gear 10, 20, respectively. The gear 20 of the HP rotor 2 is situated at the upstream end of the HP rotor, the gear 10 of the LP rotor 1 being situated just upstream of this end. The intermediate casing is a structural casing, of which an outer shroud is situated in the extension and downstream of the fan casing, comprising structural arms and being in particular the casing to which the pylon is attached for upstream connection to the aircraft intended to be propelled by the turbojet. The intermediate casing is situated longitudinally between the LP compressor and the HP compressor.

Each bevel gear 10, 20 of a rotor 1, 2 meshes with a bevel gear 11, 21, respectively, that will be called the movement uptake gear 11, 21, allowing a 90° angle transmission. Depending on the space requirement at these gears (10, 11), (20, 21) and their angular and radial spacing from one another, an increase in the speed of movement, as opposed to their number of teeth (called the reduction ratio), can be provided at each pair of meshed gears (10, 11), (20, 21).

Each movement uptake gear 11, 21 is fixedly attached to a movement transmission shaft 12, 22 which extends radially relative to the axis of the turbojet toward the outside of the turbojet, in a structural arm of the intermediate casing. The shafts 12, 22 here extend concentrically with one another in said structural arm. Shown as reference number 3, in dashed lines, is a radial sectional view of the structural arm in which the movement transmission shafts 12, 22 extend; it can be seen that the shape of the arm is aerodynamic. This radial sectional view 3 is superimposed on the axial sectional view of FIG. 1.

At its outer radial end, each of these transmission arms 12, 22 comprises a bevel gear 13, 23, called the movement transmission gear 13, 23, fixedly attached to the transmission arm 12, 22, which meshes with a bevel gear 14, 24, called the alternator drive gear 14, 24, or drive gear 14, 24, allowing an angle transmission, 90° in this instance. Again, an increase in the speed of movement may be provided here.

The turbojet comprises an alternator 30, comprising an armature 31 and an inductor winding 32. The rotation of the inductor winding 32 relative to the armature 31, in a known manner, generates electricity. In this instance, the alternator 30 is a permanent magnet alternator.

The inductor winding 32 is a rotor, mounted so as to rotate relative to the armature 31, about the axis A of the alternator 30. The inductor winding 32 supports at its periphery magnets 33 whose magnetic charge remains constant over time, hence the name permanent magnets. The rotor of the inductor winding 32 is fixedly attached to an input shaft 34 and an output shaft 35.

The armature 31 has the shape of a cylinder, supporting on its inner wall a coil 36, situated level with the magnets 33 of the inductor winding 32, the latter extending within the armature 31 and concentrically with the latter. The rotation of the magnets 33 relative to the coil 36 implies the generation of an electric current within the coil 36. The armature 31 is fixedly attached to an input shaft 37 and an output shaft 38, said input shaft 37 and output shaft 38 extending concentrically and about the input shaft 34 and output shaft 35 respectively fixedly attached to the inductor winding 32.

At this point of the description it should be noted that no reference has been made to the bearings of the turbojet of the invention, for the various rotating parts that are particularly the LP rotor 1 and HP rotor 2, the transmission shafts 12, 22 and the various parts of the alternator 30. No reference either will be made thereto in the rest of the description, because those skilled in the art are totally competent to provide bearings for the parts rotating relative to one another and to the fixed structure of the turbojet, in order to provide their support and freedom of rotary movement on their axis. These bearings, as it happens, have been represented schematically in the figures. Their installation and dimensions are fully accessible to those skilled in the art by routine work.

Note that the fixed structure 39 of the turbojet, in particular here comprising the frame 39 of the alternator 30, has been shown cross-hatched in FIGS. 1 and 2.

The drive gear 24, rotated by the HP rotor 2 by means of the movement transmission shaft 22, is arranged at the end of the input shaft 34 of the inductor winding 32. The inductor winding 32 is therefore rotated by the HP rotor 2. Its rotation speed depends on the reduction ratio between the teeth of the various movement transmission gears 20, 21, 23, 24. It is possible to provide other gears to change the speed or the direction of rotation of the inductor winding 32.

The armature 31, commonly called the stator in conventional alternators, is in this instance a rotor, that is to say that it is mounted so as to rotate about the axis A of the alternator 30 relative to the fixed structure 39 of the turbojet.

The drive gear 14, rotated by the LP rotor 1 by means of the movement transmission shaft 12, is arranged at the end of the input shaft 41 of a clutch means 40. The clutch means 40 is in this instance a clutch known as a "clutch-brake", due to the similarity of its structure with a disk brake. Clutch-brakes are well known for their reliability. The clutch-brake 40 is connected at the output to the input shaft 37 of the armature 31 of the alternator 30. It is coaxial with the alternator 30.

The clutch-brake 40 is arranged so that, in its disengaged mode, it renders the armature 31 fixedly attached in rotation to the fixed structure 39 and thus stops it rotating, and so that, in its engaged mode, it engages or connects the armature 31 to the input shaft 41 of the clutch-brake 40, that is to say that the armature 31 is rotated by the LP rotor 1 of the turbojet.

The structure of the clutch-brake 40 is conventional and will now be described fairly succinctly, the details of this structure being available to those skilled in the art.

The input shaft 37 of the armature 31 is the output shaft of the clutch-brake 40. It supports a first disk 42 and a second disk 43, extending across its axis A, that are fixedly attached thereto. The clutch-brake 40 furthermore comprises a disk 44 that can be moved in translation. Each of the disks 42, 43 fixedly attached to the output shaft 37 of the clutch-brake 40 is arranged to form a portion of a jaw, the movable disk 44 forming the other portion of the jaw with one or other of the disks 42, 43, depending on whether the clutch-brake 40 is in the disengaged or engaged state respectively.

The jaws (42, 44), (43, 44), are arranged to be able to engage with a first pad 45 and a second pad 46 respectively which they squeeze between their disk 42, 43 fixedly attached to the output shaft 37 and the movable disk 44. Each pad 45, 46 therefore extends between the two portions of a jaw (42, 44), (43, 44), respectively. These pads 45, 46 are formed with friction materials, in a conventional manner. Such a pad 45, 46, if it is just in contact with a part (in this instance the disk of a jaw (42, 44), (43, 44)), rubs against it in the event of relative movement between the two, but without there being any drive. On the other hand, if the pad 45, 46 is pressed with a sufficient pressure against the part, it is fixedly attached to it and any rotary movement of one of them causes the other to move; such an anchoring of the pad against the part is obtained thanks to the friction forces generated by the pressure exerted by the jaws (42, 44), (43, 44) on the pads 45, 46. The operation of the jaws (42, 44), (43, 44) with the pads 45, 46 is therefore just like the operation of disk brakes.

If a pad 45, 46 is compressed between the two portions of a jaw (42, 44), (43, 44), it renders these portions of jaw (42, 44), (43, 44) fixedly attached to it. If the two portions of a jaw (42, 44), (43, 44) are not pressed against one another in order to compress a pad 45, 46 between them, this pad 45, 46 and the two portions of jaw (42, 44), (43, 44) are not fixedly attached in rotation and can rotate freely relative to one another. Usually, in this case, there may even so be contact between the pad 45, 46 and one and/or the other of the jaw portions (42, 44), (43, 44), but the friction is not sufficient to render them fixedly attached in rotation.

The first pad 45 is fixedly attached to the fixed structure 39 of the turbojet. Consequently, when the movable disk 44 compresses the first pad 45 against the first disk 42, the first disk 42 and hence the output shaft 37 of the clutch-brake 40 are fixedly attached to the fixed structure 39. Therefore the armature 31 is fixedly attached to the fixed structure 39 and is prevented from rotating: this is the disengaged position of the clutch-brake 40.

The second pad 46 is fixedly attached to a disk 47 itself fixedly attached to the input shaft 41 of the clutch-brake 40 and therefore, by means of the movement transmission shaft 12, to the LP rotor 1. Consequently, when the movable disk 44 compresses the second pad 46 against the second disk 43, the second disk 43 and hence the output shaft 37 of the clutch-brake 40 are fixedly attached in rotation to the input shaft 41 of the clutch-brake 40, that is to say that they are rotated by the LP rotor 1. Therefore, the armature 31 is rotated by the LP rotor 1: this is the engaged position of the clutch-brake 40.

In the portion of FIG. 2 situated above the axis A of the alternator 30, the clutch-brake 40 is in the disengaged position. This is the default position of the clutch-brake 40. This position is obtained thanks to a spring 48 placed between the second disk 43 and the movable disk 44 and that forces the movable disk 44 toward the first disk 42, as shown schematically by the arrow 50: the first jaw (42, 44) is therefore closed and compressed onto the first pad 45 and the armature 31 is prevented from rotating. In this position, the second pad 46 rotates freely with the input shaft 41 of the clutch-brake 40, without taking with it the second disk 43 (there may where necessary be friction between the two, but no drive).

In the portion of FIG. 2 situated below the axis A of the alternator 30, the clutch-brake 40 is in the engaged position. A hydraulic circuit is provided on the turbojet, symbolized by the lines indicated by reference number 51. Thanks to the latter, oil may be supplied in a closed space 52 made between the first disk 42 and the movable disk 44. If the oil pressure is sufficiently high, it opposes the force exerted by the spring 48; the movable disk 44 is therefore forced toward the second disk 43, against the action of the spring 48, as schematized by the arrow 53. The second jaw (43, 44) is therefore closed and compressed on the second pad 46 and the armature 31 is rotated by the LP rotor 1. In this position, the first pad 45 remains fixedly attached to the fixed structure 39, while the first disk 42 rotates with the output shaft 37 of the clutch-brake 40; there may where necessary be friction between the two but no drive.

Therefore, the hydraulic circuit 51 makes it possible to operate the clutch-brake 40 between a disengaged position, in which the armature 31 is fixed, the inductor winding 32 furthermore being rotated by the HP rotor 2, and an engaged position, in which the armature 31 is rotated by the LP rotor 1, while the inductor winding 32 is rotated by the HP rotor 2. The armature 31 and the inductor winding 32 are rotated in a contrarotational manner.

In the case in question, the LP rotor 1 and HP rotor 2 contrarotate. If the LP rotor 1 and the HP rotor 2 corotate, it is easy for those skilled in the art to adapt the movement transmission from these rotors 1, 2 to the alternator 30 so that the armature 31 and the inductor winding 32 are driven, when the clutch-brake 40 is engaged, in a contrarotational manner.

The hydraulic circuit 51 is controlled, preferably by the turbojet computer, commonly designated by the acronym FADEC, for "Full Authority Digital Engine Control"; the FADEC is the computer that controls the various members of the turbojet. Here in particular it controls the hydraulic circuit 51. The control of the hydraulic circuit 51 allows, as explained above, the control of the clutch-brake 40 and hence the control of the rotary drive or nondrive of the armature 31 by the LP rotor 1.

When the armature 31 is rotated by the LP rotor 1, in a manner that is contrarotational to the inductor winding 32, the relative speed of the inductor winding 32 relative to the armature 31 is equal to the sum, in absolute value, of the rotation speed of the armature 31 and the rotation speed of the inductor winding 32 relative to the fixed structure 39 of the turbojet. In this case, for a given power required at the output of the alternator 30, it is sufficient to take one portion of this power from the LP rotor 1, and the other portion from the HP rotor 2, these two portions of power being added together.

Note that the conversion of mechanical energy into electric energy and then the transmission of the electric energy are here carried out in a conventional manner. The output shaft 38 of the armature 31 supports brushes 38', well known to those skilled in the art, through which the electric output current generated in the armature 31 flows. Furthermore, the output shaft 35 of the inductor winding 32 supports brushes 35', well known to those skilled in the art, by which it is possible to supply an electric current making it possible to rotate the inductor winding 32 and hence the HP rotor 2; this operating mode of the alternator 30, in which the alternator 30 is supplied with electric current, makes it possible to start the turbojet. This is not truly in line with the present invention, but it is noted here that the invention does not prevent the operation of the alternator 30 as a starter for the turbojet: for this operating mode, the inductor winding 32 is rotated and the armature 31 is stopped by the clutch-brake 40.

The operation of the turbojet of the invention will now be explained in greater detail.

At cruising speed or at full throttle, for example, the HP rotor 2 rotates sufficiently fast to supply the desired power at the output of the alternator 30. In this case, the hydraulic circuit 51 is controlled so that the oil pressure in the chamber 52 is not too high, that is to say that the clutch 40 is in the disengaged position. Only the inductor winding 32 rotates, rotated by the HP rotor 2, the armature 31 remaining fixed. The alternator 30 then supplies an electric power P.

At idle speed or at approach speed (that is to say before a landing), for example, the HP rotor 2 no longer rotates sufficiently fast to supply the desired power at the output of the alternator 30 without pumping. In this case, the hydraulic circuit 51 is controlled so that the oil pressure in the chamber 52 is greater than the pressure exerted by the spring 48 and sufficient to close the second jaw (43, 44) on the second pad 46, that is to say that the clutch 40 is actuated in the engaged position. In this case, the armature 31 and the inductor winding 32 rotate in a contrarotational manner, rotated respectively by the LP rotor 1 and the HP rotor 2.

Therefore, when the clutch 40 is engaged, the same power P may be supplied by the alternator 30, whose mechanical offtake is distributed between the LP rotor 1 and the HP rotor 2.

As an example, suppose that at full throttle, the HP rotor 2 rotates at a speed of 16 000 revolutions per minute and the LP rotor 1 rotates at a speed of 4500 revolutions per minute. Suppose also that, at idle speed, the HP rotor 2 rotates at a speed of 8000 revolutions per minute and the LP rotor 1 rotates at a speed of 1000 revolutions per minute. Suppose that at full throttle, with the clutch 40 disengaged, the tangential (nominal) speed of the inductor winding 32 relative to the armature 31 is equal to 100, which produces a power P. At idle speed, the tangential speed of the inductor winding 32 relative to the fixed structure 39 is equal to 50, because the HP rotor 2 rotates half as fast; such a speed would make it possible to produce a power equal to only P/2 if the armature 31 remained fixed. However, during the transition to idle speed, the clutch 40 is controlled so as to move to the engaged position. The transmission from the LP rotor 1 to the armature 31 is dimensioned so that the tangential speed of the armature 31 relative to the fixed structure 39, when the LP rotor 1 rotates at 1000 revolutions per minute, is equal to 50, in absolute value, the armature 31 rotating in the opposite direction to the inductor winding 32. Therefore, the tangential speed of the inductor winding 32 relative to the armature 31 is equal to 50+50=100, which produces a power equal to P.

Therefore, thanks to the control of the clutch 40, the same power P can be produced both at full throttle and at idle speed, 100% of the power being taken from the HP rotor 2 at full throttle and only 50% (in the example in question) at idle speed, which reduces the risks of pumping the HP compressor.

It goes without saying that the proportion of power taken respectively from the HP rotor 2 and the LP rotor 1 at idle speed may be adapted by those skilled in the art according to their requirements simply by adapting the reduction ratios at the gears used in the drive train allowing the transmission of movement from the HP rotor 2 and LP rotor 1 to the inductor winding 32 and the armature 31 of the alternator 30. Furthermore, this drive train here is adapted so as to obtain a constant power P irrespective of the engine speed, but it is possible to make provision for the powers generated according to the engine speed to be not the same. In general, the limit of offtake from the LP rotor 1 is fixed by the authorized rotation speed limit for the armature 31.

Furthermore, the invention has been presented with reference to controlling the engagement of the clutch means 40 during the transition from a full throttle speed to an idle speed, because it is precisely in this situation that the problem at the origin of the invention arises, but it goes without saying that the control of the clutch means 40 may be carried out in other conditions.

Note also that, in the example in question, the clutch-brake 40 is controlled so as to move to a disengaged position during the transition from an idle speed to a full throttle speed.

The clutch means 40 used here is a clutch-brake, because this device is known for its reliability. Any other equivalent clutch means that fulfills a function of engaging or disengaging the armature 31 relative to the LP rotor 1 may be used, whether it be by friction (like the clutch-brake) or by magnetic coupling, for example.

In addition, the invention has been presented with the alternator 30 placed in a radially eccentric position on the turbojet, the movement being transmitted from the LP rotor 1 and HP rotor 2 to the armature 31 and the inductor winding 32 respectively, via transmission shafts 12, 22 extending radially within a structural arm of the intermediate casing of the turbojet. According to another embodiment, the LP rotor 1 and HP rotor 2 contrarotating, the alternator and the clutch are mounted coaxially with the LP rotor 1 and HP rotor 2; such a solution is more compact than the foregoing but more difficult to install.

The means of controlling the clutch 40 has been shown as being a hydraulic means 51, but any other control means could be provided, for example pneumatic or electronic, if the clutch means 40 allows.

Note finally that the alternator 30 may be either inside the accessory gearbox of the turbojet or independent of the latter.

The invention claimed is:

1. A twin-spool turbine engine, comprising a low-pressure rotor and a high-pressure rotor, an alternator, comprising an inductor winding and an armature, the high-pressure rotor rotating the inductor winding of the alternator, wherein the armature is mounted so as to rotate and the low-pressure rotor is connected to a clutch arranged so that the low-pressure rotor drives the armature in a manner that is contrarotational to the inductor winding when the clutch is engaged.

2. The turbine engine as claimed in claim 1, wherein, the turbojet comprising a fixed structure, the clutch is arranged so that, when the clutch is disengaged, the armature is fixedly attached in rotation to the fixed structure and thereby stop the armature from rotating, and, when the clutch is engaged, the clutch connects the armature with the low-pressure rotor of the turbine engine.

3. The turbine engine as claimed in claim 2, wherein the clutch comprises a clutch-brake.

4. The turbine engine as claimed in claim 2, wherein the clutch is controlled by hydraulic means.

5. The turbine engine as claimed in claim 2, wherein, the alternator being placed in a radially eccentric position on the turbojet, the movement is transmitted from the low-pressure rotor and high-pressure rotor to the armature and the inductor winding by transmission shafts that are radial relative to the axis of the turbine engine.

6. A method of transmitting movement to an alternator, in a twin-spool turbine engine, comprising a low-pressure rotor and a high-pressure rotor, an alternator, comprising an inductor winding and an armature, wherein:

at a first engine speed, the high-pressure rotor rotates the inductor winding of the alternator, the armature remaining fixed, and at a second engine speed, the high-pressure rotor rotates the inductor winding of the alternator and the low-pressure rotor drives the armature in a manner that is contrarotational to the inductor winding.

7. The method as claimed in claim 6, wherein the turbojet comprises a clutch arranged so that the low-pressure rotor drives the armature in a manner that is contrarotational to the inductor winding when the clutch is engaged and the armature remains fixed when the clutch is disengaged.

\* \* \* \* \*